United States Patent
Favetta et al.

(10) Patent No.: US 12,300,801 B2
(45) Date of Patent: May 13, 2025

(54) PROCESS FOR PRODUCING HIGHLY ACTIVATED ELECTRODE THROUGH ELECTRO-ACTIVATION

(71) Applicant: Controlamatics Corporation, Cedar Knolls, NJ (US)

(72) Inventors: Dino Favetta, Cedar Knolls, NJ (US); Tao Chen, Jersey City, NJ (US); Eric P. Boon, Bloomfield, NJ (US)

(73) Assignee: Controlamatics Corporation, Park Ridge, NJ (US)

( * ) Notice: Subject to any disclaimer, the term of this patent is extended or adjusted under 35 U.S.C. 154(b) by 0 days.

(21) Appl. No.: 17/854,790

(22) Filed: Jun. 30, 2022

(65) Prior Publication Data

US 2022/0336786 A1    Oct. 20, 2022

Related U.S. Application Data

(63) Continuation of application No. 16/935,850, filed on Jul. 22, 2020, now abandoned, which is a
(Continued)

(51) Int. Cl.
*C25D 7/00* (2006.01)
*H01G 11/26* (2013.01)
(Continued)

(52) U.S. Cl.
CPC ............ *H01M 4/0452* (2013.01); *C25D 7/00* (2013.01); *H01G 11/26* (2013.01); *H01G 11/32* (2013.01);
(Continued)

(58) Field of Classification Search
None
See application file for complete search history.

(56) References Cited

U.S. PATENT DOCUMENTS 4,273,839 A * 6/1981 Carr .................. H01M 4/96
                                                            429/51
9,478,324 B1 * 10/2016 Favetta ............. H01M 4/583
(Continued)

FOREIGN PATENT DOCUMENTS

CN    101302051 B    11/2011
EP    2835362 A1    2/2015
(Continued)

OTHER PUBLICATIONS

WO 2014033756, Chetty et al. (Year: 2014).*
(Continued)

*Primary Examiner* — Stefanie S Wittenberg
(74) *Attorney, Agent, or Firm* — McCarter & English, LLP

(57) ABSTRACT

A method for treating a carbonaceous biochar electrode with an applied electric potential and resulting electric current, while submerged in an electrolyte, is disclosed in order to increase the biochar electrode's pore surface area and pore hierarchy, to affect a cleaning of unwanted materials and compounds from within the electrode and to optionally plate materials onto the surface pores of the electrode, such as graphene or metals, thus increasing the energy storage capacity of the biochar electrode when used in an energy storage device. Exemplary applications include electrodes for ultra-capacitors, pseudo-capacitors, batteries, fuel cells and other absorbing and desorbing applications.

23 Claims, 9 Drawing Sheets

Related U.S. Application Data continuation of application No. PCT/US2020/025648, filed on Mar. 30, 2020.

(60) Provisional application No. 62/826,038, filed on Mar. 29, 2019.

(51) Int. Cl.
  H01G 11/32 (2013.01)
  H01G 11/86 (2013.01)
  H01M 4/04 (2006.01)
  H01M 4/133 (2010.01)
  H01M 4/1393 (2010.01)

(52) U.S. Cl.
  CPC ............ H01G 11/86 (2013.01); H01M 4/133 (2013.01); H01M 4/1393 (2013.01)

(56) References Cited

U.S. PATENT DOCUMENTS

| | | |
|---|---|---|
| 10,121,563 B2 | 11/2018 | Favetta et al. |
| 2011/0162960 A1 | 7/2011 | Yang et al. |
| 2015/0093640 A1 | 4/2015 | Majima et al. |
| 2016/0068971 A1 | 3/2016 | Phillips |
| 2016/0168726 A1 | 6/2016 | Dryfe et al. |
| 2017/0040083 A1 | 2/2017 | Favetta et al. |

FOREIGN PATENT DOCUMENTS

| | | |
|---|---|---|
| JP | 09129515 A | 5/1997 |
| JP | 201365639 A | 4/2013 |
| WO | 2013016367 A1 | 1/2013 |
| WO | 20130146464 A1 | 10/2013 |
| WO | 2014033756 A2 | 3/2014 |
| WO | 2020205697 A1 | 10/2020 |

OTHER PUBLICATIONS

Sajadi et al. "A comprehensive review of physical activation of biochar for energy and environmental applications", Rev Chem Eng, 2018, p. 1-42 (Year: 2018).*
English translation JP 2013-065639 (Year: 2013).*
Chinese Office Action from related CN application No. 202080040015.4 issued Jul. 4, 2023.
Chinese Office Action from related CN application No. 202080040015.4 issued Nov. 9, 2022.
Eurasian Office Action from related EA application No. 202192594 issued Aug. 29, 2022.
Eurasian Office Action from related EA application No. 202192594 issued May 31, 2023.
Indian Office Action from related IN application No. 202117045522 issued Sep. 3, 2023.
Indonesian Office Action from related IN application No. P00202109280 issued Jun. 22, 2023.
Japanese Office Action from related JP application No. 2021-560318 issued Dec. 12, 2022.
Japanese Office Action from related JP application No. 2021-560318 issued Jul. 4, 2023.
Jiang, High Temperature Monolithic Biochar Supercapacitor Using Ionic Liquid Electrolyte, Journal of The Electrochemical Society, vol. 164, No. 8, 2017, pp. H5043-H5048.
PCT International Search Report and Written Opinion dated Jun. 16, 2020 for PCT Application No. PCT/US2020/025648.
Sajjadi et al. "A comprehensive review of physical activation of biochar for energy and environmental applications", Rev Chem Eng, 2018, p. 1-42 (Year: 2018).
Search Report from European related application No. 20781289.2 issued Jan. 1, 2023.

* cited by examiner

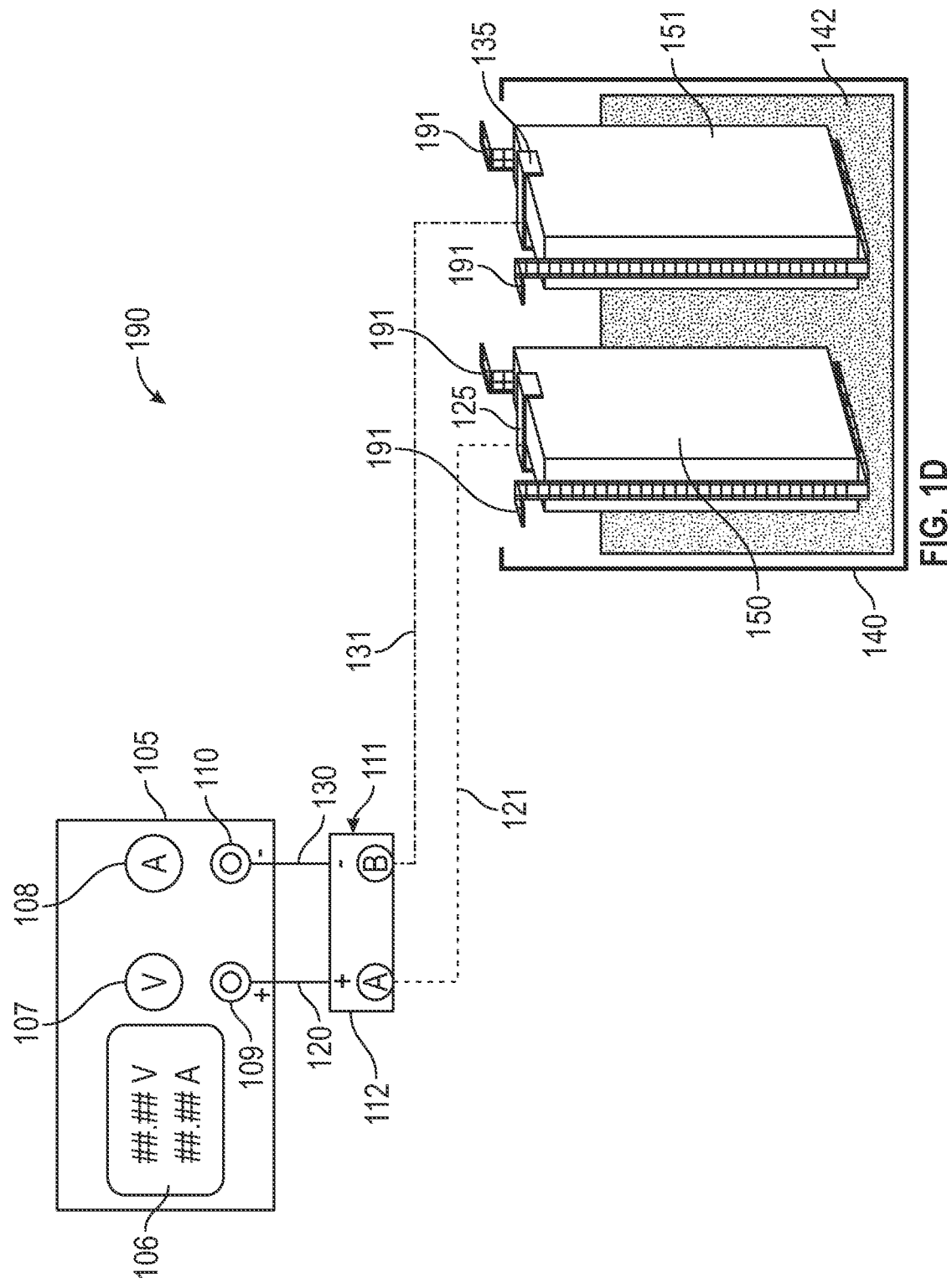

PROCESS FOR PRODUCING HIGHLY ACTIVATED ELECTRODE THROUGH ELECTRO-ACTIVATION

CROSS-REFERENCE TO RELATED APPLICATIONS

The present application is a continuation application that claims the benefit of a US non-provisional patent application that was filed on Jul. 22, 2020 and assigned Ser. No. 16/935,850, which was a continuation application claiming priority benefit to a PCT patent application, PCT/US2020/025648, filed Mar. 30, 2020, which in turn claimed the benefit of a US provisional patent application entitled "Process for Producing Highly Activated Electrode Through Electro-Activation," which was filed on Mar. 29, 2019, and assigned Ser. No. 62/826,038. The subject matter of each of the foregoing applications is herein incorporated by reference in its entirety.

BACKGROUND

Technical Field

The present disclosure describes a method of treatment of an electrode material with an applied electrical potential and electric current, to induce electrolysis treatment of the electrode.

Background Art

As alternative energy, renewable energy and electric cars grow more and more popular, existing energy storage technology is inadequate and will continue to fall short of meeting the growing demand for absorbing, storing and rapidly delivering of electrical energy unless a new energy storage solution is found. A major focus has been on lithium-based chemistry for rechargeable batteries. These batteries involve chemical reactions to store electric power. The reactions are slow and generate heat, which causes inherent loss of energy. In most battery embodiments, one electrode has significant carbon makeup. The other electrode's potency is a function of its surface area and pore volume that therein provides molecular sites for the electrochemical reaction and hence for electric charge energy storage to occur.

Ultra-capacitors store electrical energy by an electrostatic mechanism, not a chemical reaction as found in batteries. Therefore, the electric charge storage mechanism in ultra-capacitors is not rate-limited by a chemical reaction. The superior charge storage capability of ultra-capacitors is a function of pore volume and surface area. The energy storage mechanism of ultra-capacitors via transport of ions and attraction to the charge storage sites on the electrodes is limited in the existing technology because of the electrode morphology applied to the supporting members (foils, membranes, separators, etc.) that form "packaging overhead" in the overall ultra-capacitor device assembly for the given amount of electrode material. Limitations of that electrode layer in existing ultra-capacitor technology are founded in either the thickness of the electrode as it resides between the charge collector metal foil and the non-conductive separator membrane, as well and the total surface area within the channels, walls and pores of the electrode.

These electrodes are generally fabricated from electrically conductive activated carbon. Other materials for the electrode apply highly scientific and costly engineered materials such as carbon nanotubes, fullerenes, "Bucky-Balls" and other such mesh-like and web-like molecular structures, to increase the available surface area within the pores, walls and channels of the electrode.

Although ultra-capacitors store much more electric energy than standard capacitors, they generally store orders of magnitude less electric energy than lithium-based batteries. Since there is no chemical reaction in ultracapacitors as found in batteries, ultra-capacitors charge and discharge their energy orders of magnitude faster than batteries. According to conventional technologies, the electrical storage performance comparison between batteries and ultracapacitors becomes a trade-off.

A need exists for systems/methods that overcome the inherent trade-off between storage capacity and discharge rate, as discussed above.

SUMMARY

The present disclosure provides an advantageous electrolysis treatment pursuant to which, in an aqueous (water) electrolyte bath condition, water ($H_2O$) is split at the outer and inner surfaces of the pores in the electrode to form hydrogen ($H_2$) gas and oxygen ($O_2$) gas that escape out of the carbonaceous electrode pores into the bath and expel loose materials (carbonaceous and other impurities) from inside the electrode pores outward. This outward escape of gas serves as a pore generation and pore expansion treatment, thus initially activating or further activating the electrode.

Furthermore, the ambiance of water electrolysis which produces the hydrogen, oxygen, and related solute molecular species ($H_3O^+$, $H^+$, $OH^{-1}$ etc.) also kinetically react and electro-chemically react with materials of the carbonaceous electrodes, and remove undesirable compounds, thereby further activating the electrodes. The kinetically driven reactions and electrochemically driven reactions can be selectively controlled to remove undesirable materials from the electrode and not affect or minimally affect the base carbon structures and materials of the electrode by control of the voltage window applied in the disclosed treatment. Furthermore, these electrochemically driven and kinetically driven cleaning reactions can be controlled, enhanced and modified by addition of other solutes, salts, acids an bases in the electrolyte solution.

Additionally, the disclosed electrolysis treatment of the carbonaceous electrode grows advantageous nanostructures that are electrodeposited plating material on the surface of the electrode and in the channels and pores of the electrode which increase the surface area and therefore increases the energy storage capability when the electrodes are used in an electric double layer capacitor, ultracapacitor, pseudo-capacitor, battery or fuel cell as electrodes, or as any other adsorbing or adsorbing-desorbing function, or as electrodes in water-electrolysis based hydrogen gas and oxygen gas generators.

Additional features, functions and benefits of the disclosed systems and methods will be apparent from the description which follows.

BRIEF DESCRIPTION OF THE FIGURES

To assist those of ordinary skill in the art in making and using the disclosed systems/methods, reference is made to the accompanying figures, wherein:

FIGS. 1A thru 1D schematically depict an exemplary electrochemical setup according to the present disclosure;

DESCRIPTION OF EXEMPLARY EMBODIMENTS

Figure 1A:
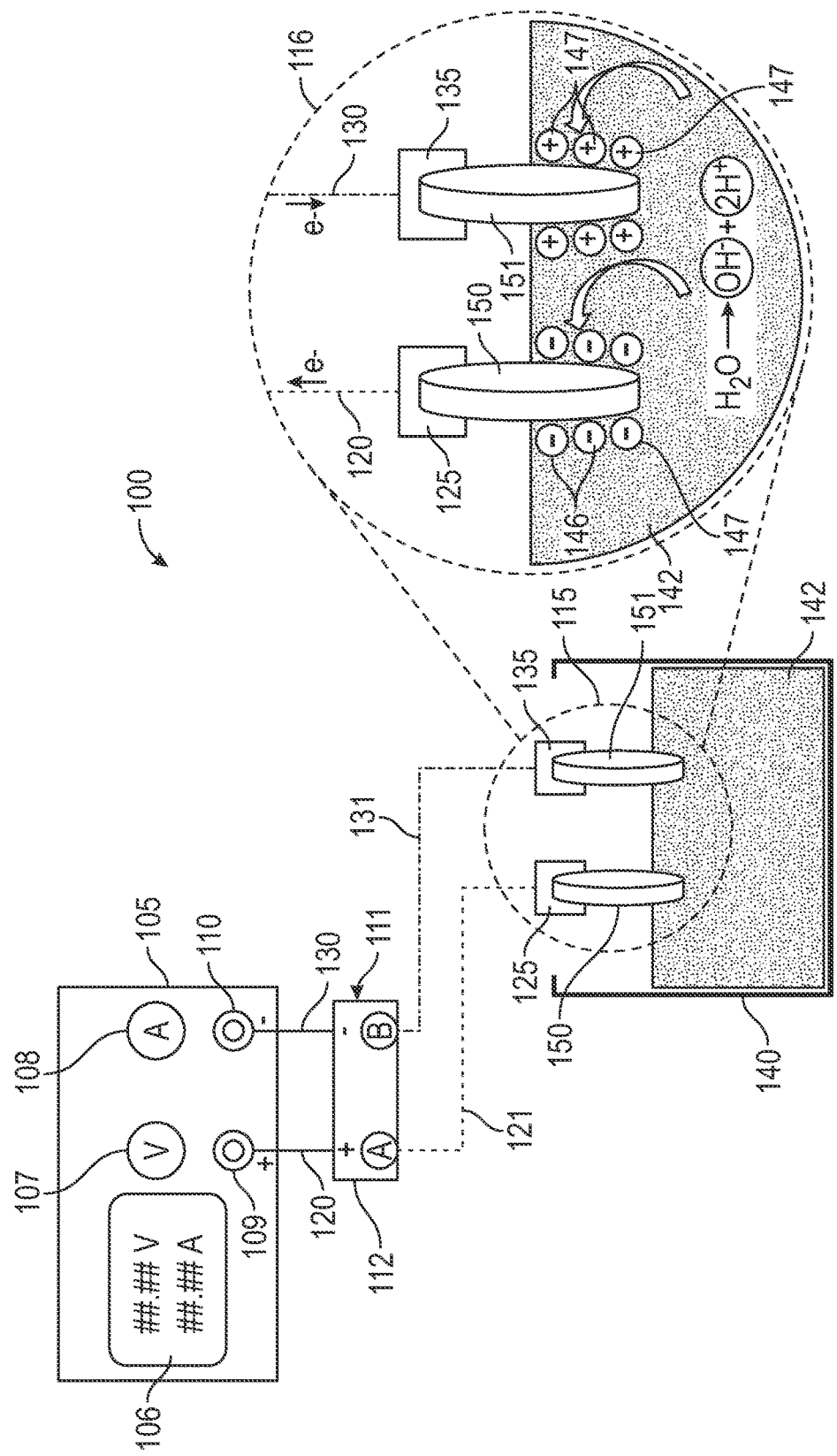

Discussion of the Figures:

With reference to the exemplary setup schematically depicted in FIG. 1A, the following components are identified as:

- 100: Overall apparatus setup for implementation of the disclosed methods for a single pair of electrodes being treated by Electro-Activation
- 105: The DC Power Source, hereinafter Power Supply (in an exemplary implementation, the DC Power Supply is a TekPower Model TP3005T DC Power Supply)
- 106: The Digital Display of Voltage output and Amperage Current output of the Power Supply (105)
- 107: The Voltage Output Adjustment of the Power Supply (105).
- 108: The Amperage Output Adjustment of the Power Supply (105).
- 109: The Positive Voltage Terminal of the Power Supply (105)
- 110: The Negative Voltage Terminal of the Power Supply (105)
- 111: Stimulus input to the Voltage Polarity Reversing Device (112); the stimulus can originate from within the Voltage Polarity Reversing Device (112) or be external to the Voltage Polarity Reversing Device (112)
- 112: A Voltage Polarity Reversing Device such that two distinct states of Direct Output Polarity and Reverse Output Polarity are possible when observing or measuring the device (112) output polarity terminals "A" and "B" relative to the device input polarity, and such device having a polarity switching activation caused by mechanical electrical stimulus (111), such as a timing device, such as manual manipulation. The output terminals of (112) are labeled A and B wherein, when the Voltage Polarity Reversing Device (112) is in the initial or resting state (unmanipulated by (111) or unstimulated by (111)) the "A" terminal provides the Positive Voltage Potential and the "B" Terminal provides the Negative Voltage Potential sourced from the DC Power Supply (105). Furthermore, when the Voltage Polarity Reversing Device (112) is in the active state (manipulated by (111) or stimulated by (111)) and device (112) performs its Voltage Polarity Reversing function the "B" terminal provides the Positive Voltage Potential and the "A" Terminal provides the Negative Voltage Potential as sourced by the DC Power Supply (105).
- 115: A diagrammatic graphical zone delineating a specific area of the Overall Apparatus (100), wherein the delineated area is further amplified for detail and annotation in an expanded view, shown in the right-side area of (100) and wherein the zoom view area is depicted as (116).
- 116: The diagrammatic graphical area for expanded view and delineation providing further detail on the apparatus shown in (115). The details within (116) further depicting the Electrodes (150) and (151) and the Fastener Clips (125) and (135) as in the polarized state when the Voltage Polarity Reversing Device (112) is in the rest position and not stimulated by (111), thereby providing Positive Voltage to Fastener Clip (125) and Electrode (150), and Negative Voltage to Fastener (135) and Electrode (151).
- 120: The Positive Voltage Wire Conductor from the Power Supply (105) Positive Polarity Terminal (109) to the Positive Voltage Input of the Voltage Polarity Switching Device (112).
- 125: The "A" Voltage Electrically Conductive Fastener Clip of the Assembly holding the "A" Polarity Electrode (150). Observe that neither the Electrically Conductive Wire (120) nor the Electrically Conductive Fastener Clip (125) is in contact with the electrolyte (142).
- 130: The Negative Voltage Wire Conductor from the Power Supply (105) Negative Polarity Terminal (110) to the Negative Voltage Input of the Voltage Polarity Switching Device (112).
- 135: The "B" Voltage Electrically Conductive Fastener Clip of the Assembly holding the "B" Polarity Electrode (151). Observe that neither the Electrically Conductive Wire (130) nor the Electrically Conductive Fastener Clip (135) is in contact with the electrolyte (142),
- 140: The Electrolyte Bath Vessel made of non-electrically conductive material.
- 142: The Electrolyte Liquid in the Electrolysis Bath Vessel (140).
- 145: An Annotation of the basic electrochemical reaction of the electrolysis of water occurring between the electrodes (150) and (151) across the Electrolyte Liquid (142).
- 146: Negatively Charged Ions formed during Water Electrolysis (145) being attracted to the Positive Polarity Electrode herein depicted as (150), with the understanding that (150) is shown as the Positive Polarity Electrode due to the fact that the Voltage Polarity Reversing Device (112) is in the unstimulated state.
- 147: Positively Charged Ions formed during Water Electrolysis (145), being attracted to the Negative Polarity Electrode (151) with the understanding that (151) is shown as the Negative Polarity Electrode due to the fact that the Voltage Polarity Reversing Device (112) is in the unstimulated state.
- 150: The "A" Polarity Monolithic Biochar Electrode being subject to Electro-Activation in accordance with the disclosed embodiment.
- 151: The "B" Polarity Monolithic Biochar Electrode being subject to Electro-Activation in accordance with the disclosed embodiment.

Figure 1B:
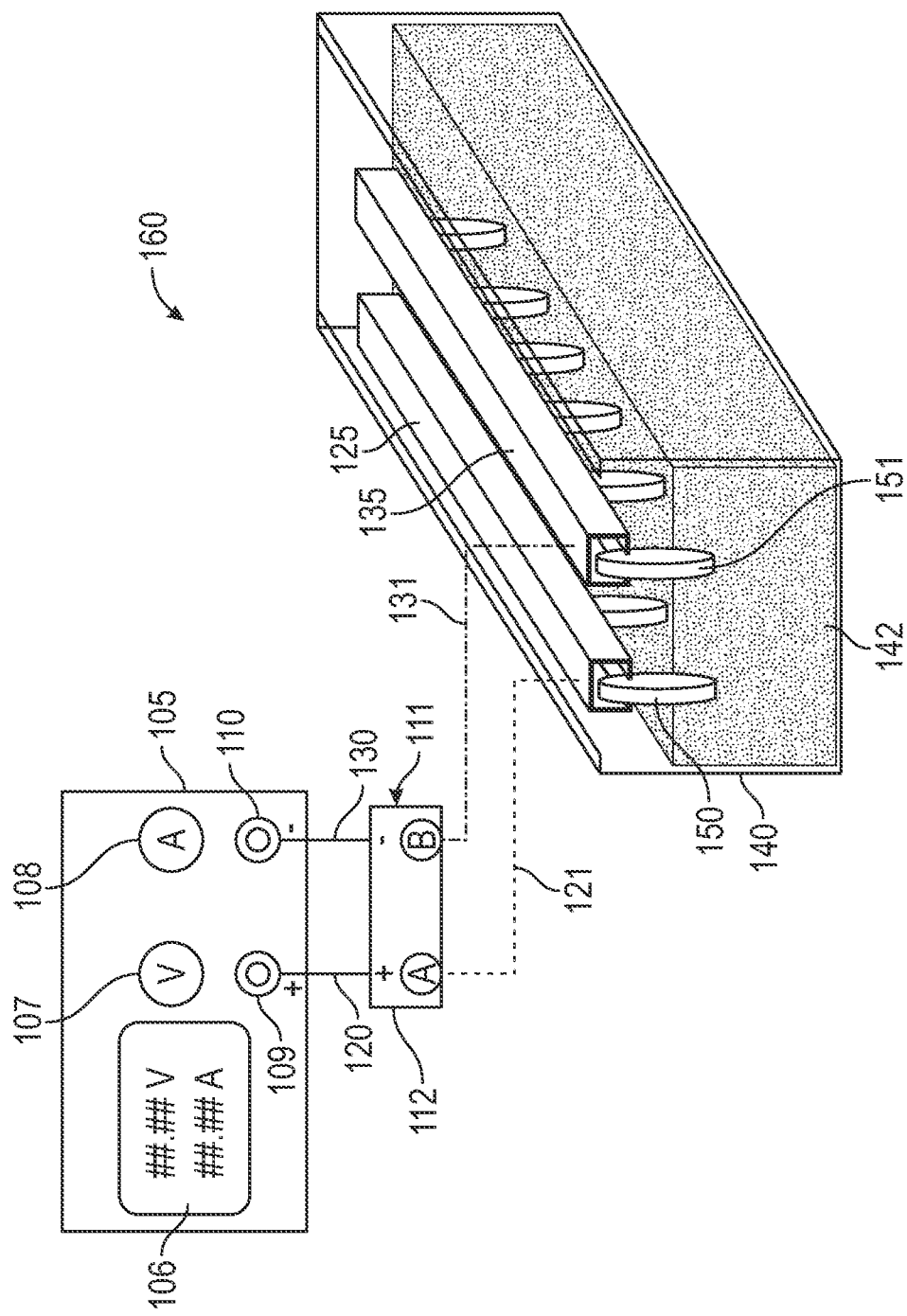

Regarding FIG. 1B—

With reference to the exemplary setup schematically depicted in FIG. 1B, the following components are identified as:

- 160: Overall apparatus setup for implementation of the disclosed methods for multiple pairs of electrodes (150), (151) being treated by Electro-Activation, each fastener clip being larger or longer than shown in FIG.

1A so as to hold more than one electrode of each polarity, with the limitation that only one fastener clip of each polarity "A", "B" is used.

Figure 1C:
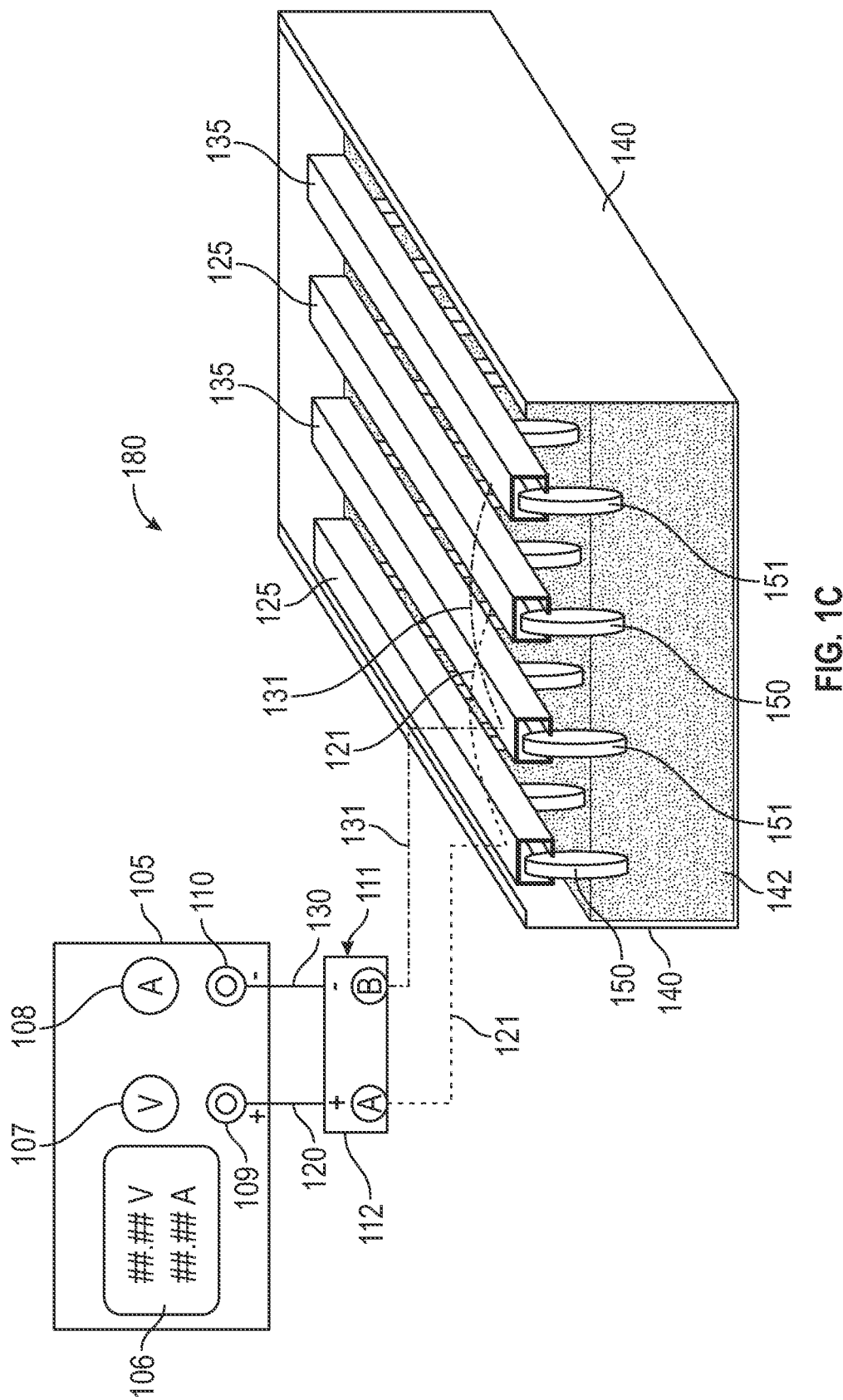

Regarding FIG. 1C—

With reference to the exemplary setup schematically depicted in FIG. 1C, the following components are identified as:

- 180: Overall apparatus setup for implementation of the disclosed methods for multiple pairs of electrodes being treated by Electro-Activation, each fastener clip being larger or longer than shown in FIG. 1A so as to hold more than one electrode of each polarity, with the extension that a multiplicity fastener clips of each polarity is used, and wherein the arrangement of each parallel fastener clip is such that the assigned polarity alternates from one fastener clip rail to the next along the arrangement.

Regarding FIG. 1D—

With reference to the exemplary setup schematically depicted in FIG. 1D, the following components are identified as:

- 190: Overall apparatus setup for implementation of the disclosed methods for a single pair of electrodes being treated by Electro-Activation, wherein the electrodes may be of significant size and weight such that the conductive fastener clips alone may not be sufficient to support and hold the electrodes submerged into the bath, thereby requiring an additional support (191).
- 191: An added support device of non-electrically conductive material providing mechanical support to the electrodes that are otherwise hanging from the conductive fastener clips, the addition of such supports (191) thereby preventing breakage of the electrodes due to gravimetric stress. Supports (191) are further connected to other external support devices (not shown) to assist in suspending the electrodes (150), (151) in the electrolyte bath (140).

With reference to the flowchart schematically depicted in FIGS. 2A and 2B, these figures show Scanning Electron Microscopy (herein after SEM) images of two similar electrodes, each being treated for activation by different methods disclosed herein.

Figure 2A:
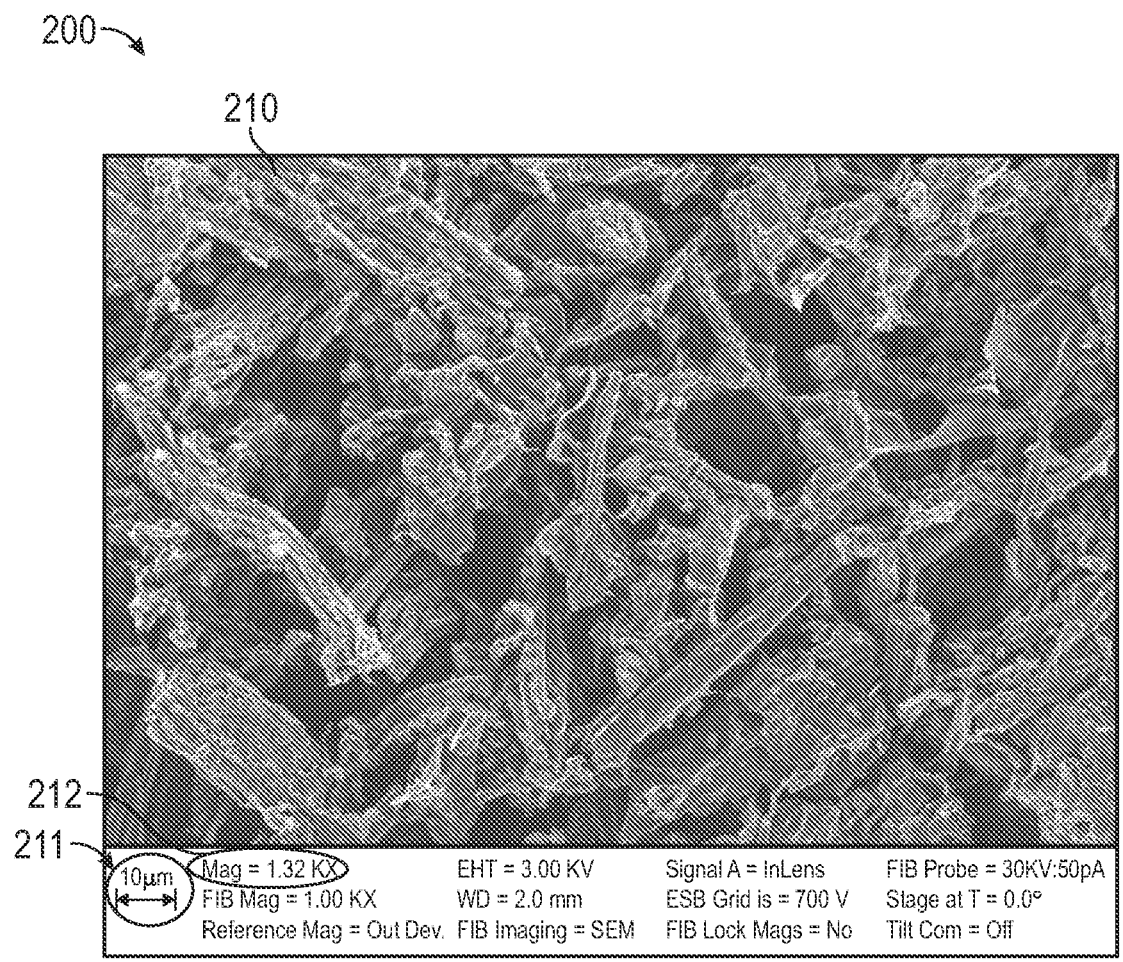
FIGS. 2A-2B are SEM images of untreated versus treated carbonaceous biochar electrode wafers.

Regarding FIG. 2A—

- 200: Overall depiction of the SEM Image therein showing a magnified image of the surface and inner body of a Monolithic Carbonaceous Biochar Electrode material resulting from treatments disclosed herein. Image 200 shows the disclosed Carbonaceous Biochar Monolithic Wafers (210).
- 210: SEM image of the results of a Monolithic Carbonaceous Biochar Electrode material having been activated by common Steam-Carbon reaction having been treated in the High Temperature Furnace with the optional Steam-Activation step.
- 211: A graphical annotation highlighting the SEM screen image (210) showing a relative scale related to the screen image for a length dimension of 10 microns.
- 212: A datum from the SEM indicating on the SEM screen image (210) the magnification of the image of 1,320 times.

Figure 2B:
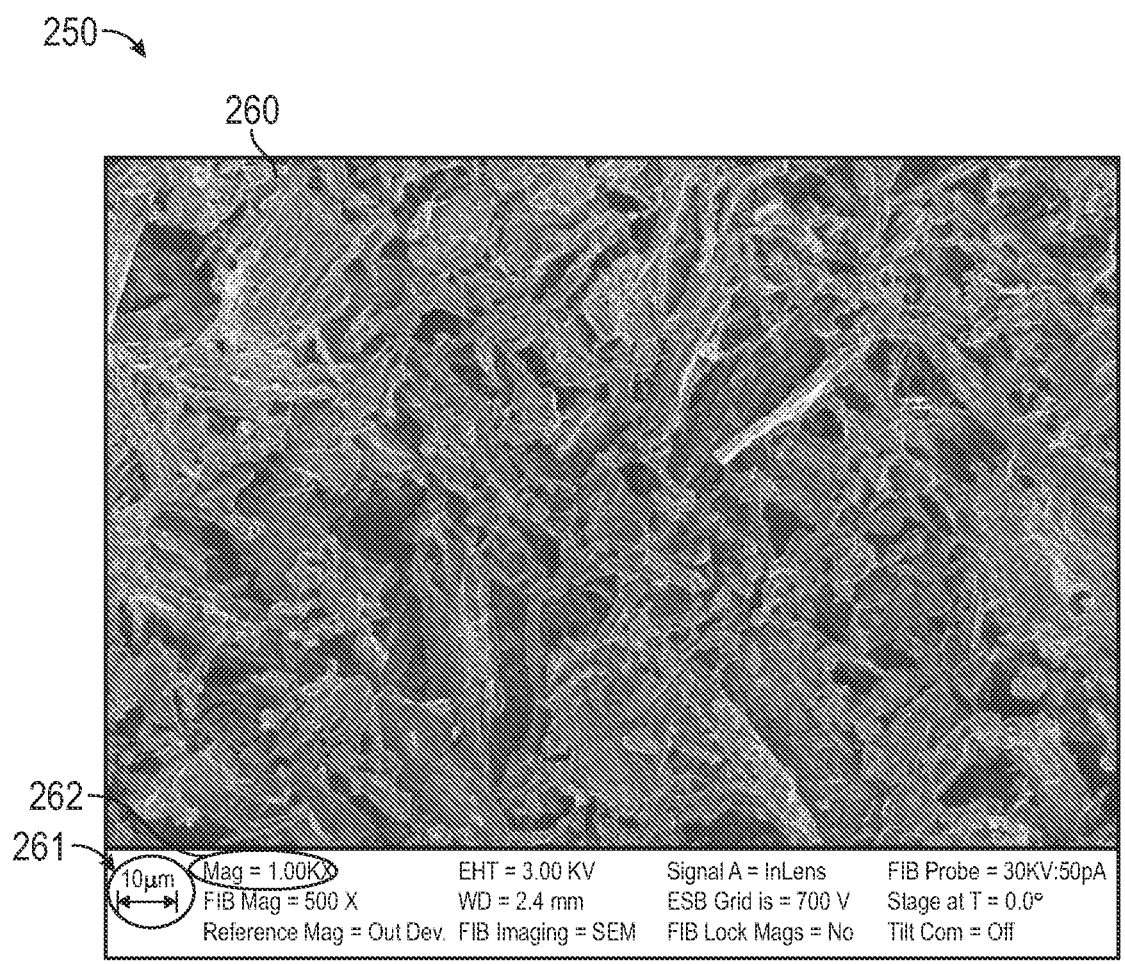

Regarding FIG. 2B—

- 250: Reference 250 shows an SEM image of the disclosed Carbonaceous Biochar Monolithic Wafer (260). The overall depiction of the SEM Image therein shows a magnified image of the surface and inner body of the Monolithic Carbonaceous Biochar Electrode material resulting from treatments disclosed in this embodiment.
- 260: SEM image of the results of a Monolithic Carbonaceous Biochar Electrode material having been activated by the disclosed Electrolysis-Activation step. A distinct "Fuzzines" of the surfaces of 260 are evident versus 210 which shows no "Fuzziness", such observable "fuzziness" being the growth of preferential nano- and micro-structures of carbon, specifically graphene and graphitic structures plated onto the monolithic biochar pore surfaces due to treatments by the disclosed methods.
- 261: A graphical annotation highlighting the SEM screen image (260) showing a relative scale related to the screen image for a length dimension of 10 microns.
- 262: A datum from the SEM indicating on the SEM screen image (260) the magnification of the image of 1,000 times.

Figure 3:
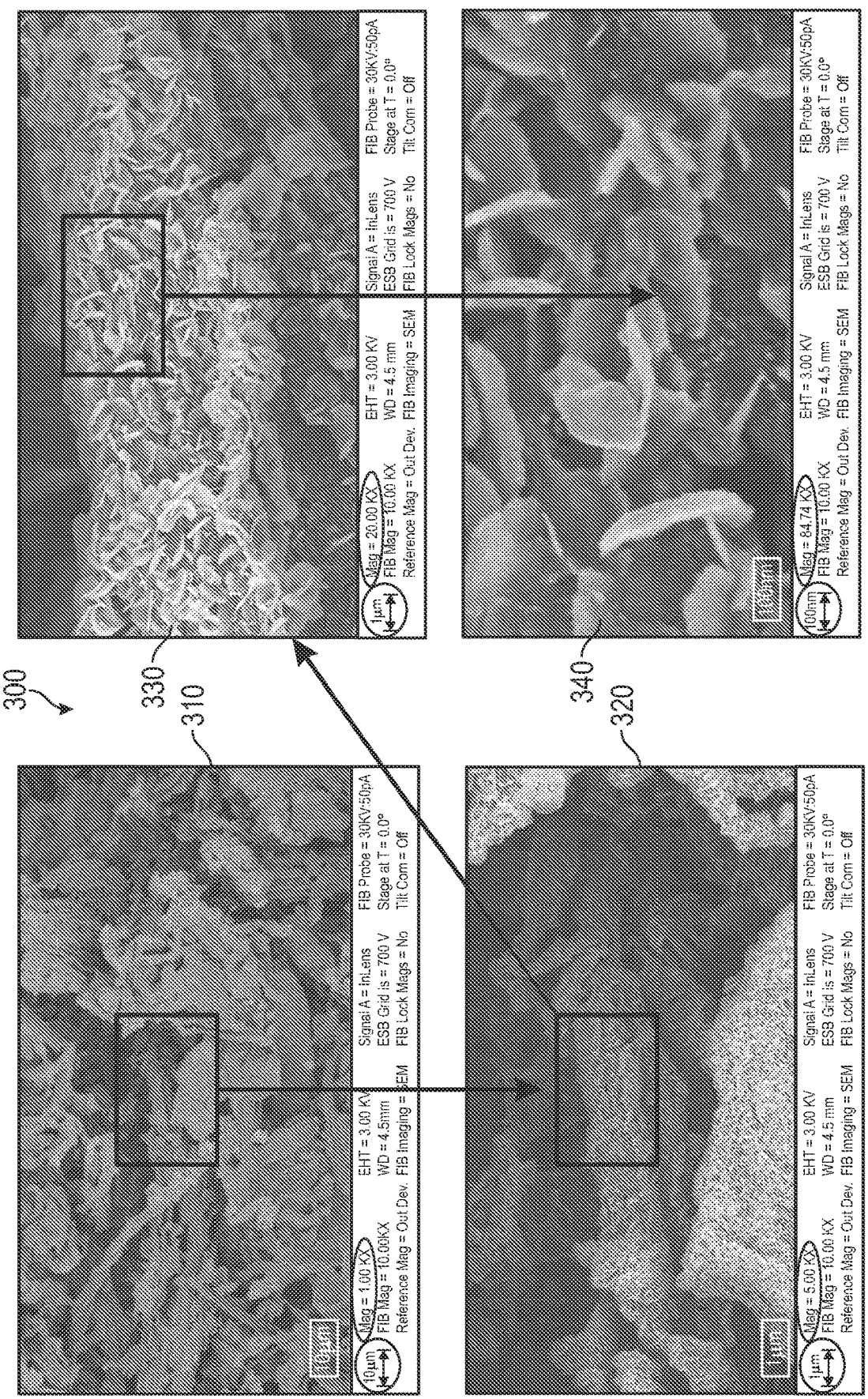
FIG. 3 provides four (4) SEM images depicting progressive magnification of the same area of the interior of an electrode treated by the electrolysis-activation method disclosed herein.

Regarding FIG. 3, an electrolyzed carbonaceous monolithic biochar wafer electrode is provided showing growth of preferential graphene and graphitic structures for superior surface area improvement for dramatic increase in capacitance. These graphene and graphitic structures are caused by the treatments to the biochar due to the disclosed method.

- 300: The overall collection of four (4) SEM images depicting progressive magnification of the same area of the interior of an electrode treated by the Electrolysis-Activation method disclosed herein.
- 310: An SEM image of the inner structures of the pores and channels of the disclosed Monolithic Carbonaceous Biochar Electrode having been treated by the disclosed method, viewed at 1,000× magnification. Further, a graphical delineation (black box and arrow) indicating the zoom area for further magnification that is subsequently shown in 320. Further, a graphical delineation (black circle) highlighting the relative dimension of the SEM image on the SEM screen capture showing the reference length of 10 microns relative to the SEM screen image. Note that in image 310, the preferential graphene and graphitic self-assembled platelets and structures only appear as a fuzzy surface on the image of the treated biochar.
- 320: An SEM image of the inner structures of the pores and channels of the disclosed Monolithic Carbonaceous Biochar Electrode having been treated by the disclosed method, viewed at 5,000× magnification. Further, a graphical delineation (black box and arrow) indicating the zoom area for further magnification that is subsequently shown in 330. Further, a graphical delineation (black circle) highlighting the relative dimension of the SEM image on the SEM screen capture showing the reference length of 1 micron relative to the SEM screen image. Note that in image 320, the preferential graphene and graphitic self-assembled platelets and structures only appear as a fuzzy surface on the image of the treated biochar.
- 330: An SEM image of the inner structures of the pores and channels of the disclosed Monolithic Carbonaceous Biochar Electrode having been treated by the disclosed method, viewed at 20,000× magnification. Further, a graphical delineation (black box and arrow) indicating the zoom area for further magnification that is subsequently shown in 340. Further, a graphical delineation (black circle) highlighting the relative dimension of the SEM image on the SEM screen capture showing the reference length of 1 micron relative to the SEM screen image. Note that in image 330, the preferential graphene and graphitic self-assembled platelets and structures are clearly visible in the SEM image and can be identified on the surface of the treated biochar.

340: An SEM image of the inner structures of the pores and channels of the disclosed Monolithic Carbonaceous Biochar Electrode having been treated by the disclosed method, viewed at 84,740× magnification. Further, a graphical delineation (black circle) highlighting the relative dimension of the SEM image on the SEM screen capture showing the reference length of 100 nanometers relative to the SEM screen image. Note that in image 340, the preferential graphene and graphitic self-assembled platelets and structures are clearly visible and obvious in the SEM image and can be identified on the surface of the treated biochar. Furthermore, the image demonstrates that the carbonaceous structures that have plated out of solution during implementation of the disclosed method are thin and flat or curved platelets of single layer and few layer graphene, having been additionally tested by the Elemental Analysis Feature of the SEM system.

Figure 4:
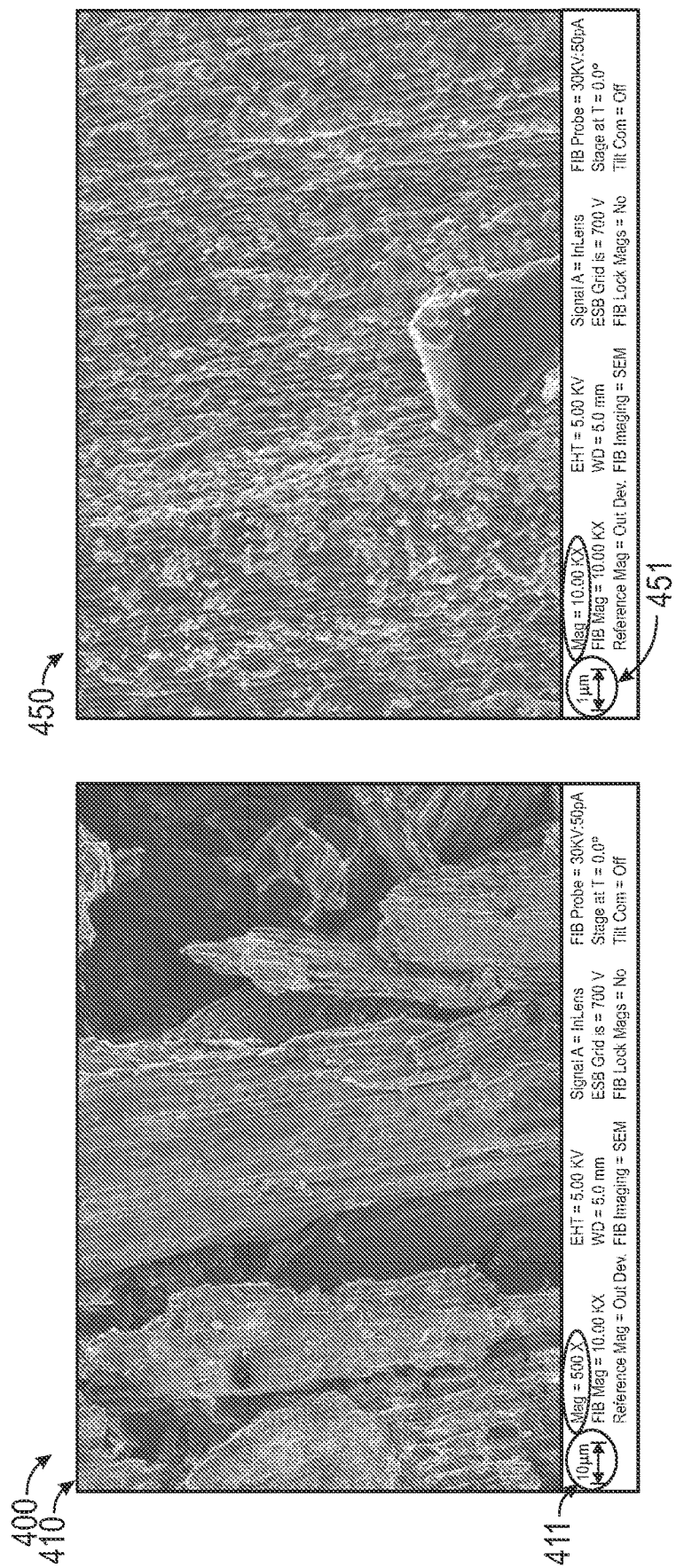
FIG. 4 provides two (2) SEM images of the same area of an untreated monolithic carbonaceous biochar electrode under different magnification revealing the absence of preferential structures otherwise created by the disclosed method.

Regarding FIG. 4:

400: Reference for two SEM images (410) and (450) side by side of the same area of the untreated Monolithic Carbonaceous Biochar Electrode under different magnification.

410: An SEM image of the untreated the surface, pores and channels of the carbonaceous biochar material at magnification of 500×.

411: A graphical delineation (black circle) of the SEM screen image showing the dimension length relative to the screen image of 10 microns.

450: An SEM image of the untreated surface, pores and channels of the carbonaceous biochar material at magnification of 10,000×.

451: A graphical delineation (black circle) of the SEM screen image showing the dimension length relative to the screen image of 1 micron.

Figure 5:
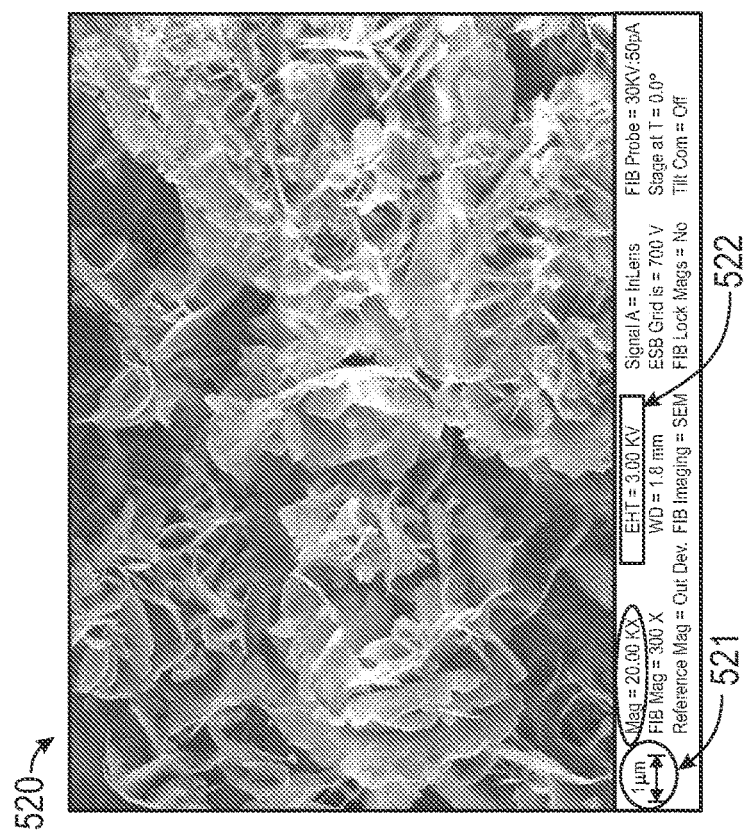
FIG. 5 provides two (2) SEM images of the same area of the treated monolithic carbonaceous biochar electrode under different magnifications.
Figure 5:
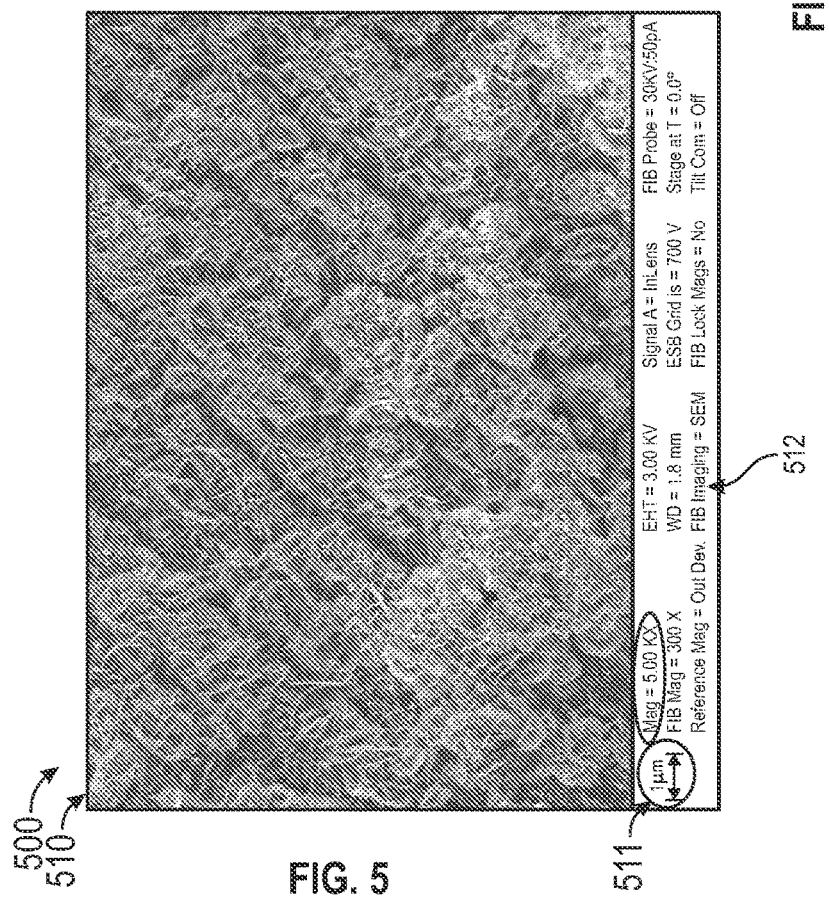

Regarding FIG. 5:

500: Reference for two SEM images (510) and (520) side by side of the same area of the treated Monolithic Carbonaceous Biochar Electrode under different magnification.

510: An SEM image of the preferentially grown and self-assembled iron flake and flower petal-like structures covering the surface, pores and channels of the carbonaceous biochar material.

511: A graphical delineation (black circle) of the SEM screen image showing the dimension length relative to the screen image of 1 micron.

512: A graphical delineation (black box) of the SEM screen image showing the magnification of 5,000×.

520: An SEM image of the preferentially grown and self-assembled iron flake and flower petal-like structures covering the surface, pores and channels of the carbonaceous biochar material at higher magnification than (510).

521: A graphical delineation (black circle) of the SEM screen image showing the dimension length relative to the screen image of 1 micron.

522: A graphical delineation (black box) of the SEM screen image showing the magnification of 20,000×.

General Summary of the Approach and Technique, Including General Components:

A) The Components: The disclosed invention embodies a carbonaceous free-standing wafer electrode of monolithic structure, electrolyte solution, an electrolysis treatment bath, electrical power supply, a polarity-reversing switching device, and related wiring and fasteners, and optional ventilation.

B) The Process: The disclosed invention is described herein as, inter alia, electrolysis treatment of the free-standing wafer electrodes, electrochemical principles, and physical arrangements.

Activated carbon, partially activated carbon, or non-activated carbon electrodes, preferably with hierarchical pores and channels, were synthesized using a net-shaped technology as described in U.S. Pat. Nos. 9,478,324 and 10,121,563 to Favetta et al., and a contemporaneously filed provisional application 62/826,005 entitled "Process for Producing a Highly Activated, Monolithic Net-Shaped Biomass Electrode for Use in an Ultracapacitor, Pseudo-Capacitor, Battery or Fuel-Cell" (the contents of which are hereby incorporated by reference; collectively referred to as the "Favetta Patent Filings") and further activated using this disclosed process herein, in an electrolytic bath under applied electric field of a controlled voltage potential (V) and direct current (DC).

The conductive carbonaceous monolithic biochar electrodes were each attached to separate current conducting fastener and submerged into an aqueous salt electrolyte bath with an applied electric field above 1.27 Volts, wherein water electrolysis begins and, more specifically, above the minimum approximate 1.65 volts or minimum 1.70 volts, where hydrogen and oxygen gas generation begins and continues through higher voltage profiles. Only the electrode material was submerged into the aqueous electrolyte solution and wetted, but not the current conductors, nor the metallic fasteners, clips nor wiring, to prevent a short circuit in the system via the exposed metal of these fasteners, into and through the conductive electrolyte solution.

The electrically conductive electrodes at the applied voltage potential enabled the splitting of water to form gaseous hydrogen ($H_2$) and oxygen ($O_2$) at the cathode and anode carbonaceous electrodes, respectively. These generated and expelled gases, and the electrochemical and kinetic reactions occurring in the pores of the electrode are particularly advantageous.

Electrolyte Bath Description

A highly concentrated salt solution electrolyte of aqueous potassium hydroxide (KOH) in distilled water of concentrations such as 4 to 5 Molar, such as 5 to 6 Molar, or such as 6 to 7 Molar, was prepared and used as the environment for the electrolysis activation bath. Pairs of partially activated carbonaceous monolithic biochar electrodes were clamped with commercially available electrically conductive fasteners, such as alligator clips, that included adding a layer of thin (0.004 inches thickness) of 316 stainless steel foils as current conductor plates actually touching the electrodes to avoid having the alligator clips from biting and damaging the monolithic carbonaceous electrodes, and such foils further increasing surface area of contact between the conductors and part of each monolithic carbonaceous electrode wafer, and such electrically conductive fasteners which were connected by insulated copper wire to a power supply (105) and a time/cycle relay (112) (see FIG. 1).

The electrical current conductor clips can be titanium, aluminum or stainless steel, or any other electrically conductive material, subject to maintaining the DC electric current flow through the system which can otherwise be inhibited by some corrosion/oxidation of the metal conductor fasteners, parts, clips and foils, caused by these metal parts' proximity to the electrolyte solute/salts and flowing electric current of the disclosed arrangement of the embodiment. Furthermore, it is advised that these electrical current conducting fasteners, foils, plates and clips should be periodically maintained, sanded, polished and cleaned as corrosion forms on them which causes electrical resistance. While the monolithic electrodes are submerged in the electrolyte bath for the disclosed electrolysis activation, it is highly recommended to cycle the polarity of the voltage potential applied to the electrode pairs so as to allow for equal and consistent electrolytic activation on both electrodes. This is embodied herein as shown in FIGS. 1A-1D as the Voltage Polarity Reversing Device (112). This cyclical voltage reversal as applied to the electrodes promulgates the related gaseous expulsion and electrochemical reactions in both polarity directions across the electrode pairs more equally; however, under certain specific embodiments of the invention, certain other beneficial effects to the electrodes can be derived if each electrode of the pair is set to be treated at only one polarity, without such polarity cyclical reversals.

Cycle times are also a function of actual voltage potential applied, and resulting current flows (DC Specific Power), or overall cumulative Specific Energy Flow, as the case may be for the varied desired end results of activation and end use of the electrode/carbonaceous materials. Successful cycle times include, but are not limited to, between 2 to 4 minutes per polarity, then reversing the voltage polarity and current flow across the electrode pair for an additional 2 to 4 minutes, thereby undergoing one voltage reversal cycle, and performing this positive-negative DC voltage reversal cycle 3 to 5 such complete cycles at a minimum of more than 2.0 Volts DC to no more than 5.5 Volts DC as measured at the electrode connection point, thus excluding voltage potential losses and voltage drops across any supporting or connective devices, such as electrical wiring and electrode fasteners, clamps, foils and clips.

Discussion of Cleaning Action/Gas Generation Caused by the Electrolysis Bath Treatment of the Invention.

When an electric voltage potential of 1.23 Volts or more is applied to water that is electrically conductive due to the presence of free ions, such as via addition of an electrolyte salt, base or acid, an electric current passes through the water solution and the electric current breaks down the water molecule ($H_2O$) into hydrogen ions ($H^+$) and hydroxyl ions ($OH^-$). As the voltage potential between the electrodes is increased to approximately 1.65 Volts to 1.7 Volts, the hydrogen ions combine and form hydrogen gas ($H_2$). Simultaneously, at these voltage conditions the disassociated hydroxyl ions reform, further disassociate and recombine and form oxygen gas ($O_2$). These ($H_2$) and ($O_2$) gas molecules agglomerate to form hydrogen gas bubbles and oxygen gas bubbles respectively. This process of water hydrolysis and generation of hydrogen gas and oxygen gas by an applied electric potential and resulting electric current is commonly understood. To form such solution, the electrical conductivity of the water is enhanced by adding a disassociating salt, acid or base, thereby creating a solution of conductive ions such as an electrolyte. The salt can be any such water-soluble salt; however, the concentration of the salt must be adequate to effectuate the desired results, and the ion components of the salt must provide the selectivity of the desired electrode activation and resultant by-product formation.

Furthermore, if material plating onto the carbonaceous electrode scaffolding within the channels and pores of the electrode is also desired, the ionic compounds must either effectuate such deposition or not inhibit such deposition if other compounds are added to the electrolyte bath solution to separately effectuate this optional desired material plating into the electrode pores.

Exemplary embodiments herein use salts, such as the stated 6 Molar potassium hydroxide (aqueous). The positively and negatively charged free radicals and ions are attracted to the cathode and anode surfaces, respectively, where electron-transfer takes place, and can recombine to form hydrogen ($H_2$) and oxygen ($O_2$) gas on the negative potential cathode electrode and positive potential anode electrode respectively.

The free radicals, electrolyzed organic compounds and formed gases also accumulate on the surface of the electrodes as well as inside the pores and channels of the porous electrodes. Upon reaching a critical bubble size, the low density of the expanding gas bubbles causes them to grow and expel outward from the electrode pores and surfaces and upward towards the surface of the aqueous bath electrolyte solution. These expulsions of gaseous vapor carry along with them the loose particles of oxidized contaminants trapped within the internal pores and channels of the activated electrode, which provides a mechanical and chemical cleansing effect and provides a first level of electrolysis activation.

Additionally, these expanding gases also expel the mixture of aqueous electrolyte solution and other organic compounds of many varied organic moieties found within the electrode (originally formed during the prior and independent charring of the source biomass—see Favetta provisional application: Ser. No. 62/826,005) that are undesirable and reside at the electrode pores' surfaces, such moieties having a detrimental effect on the electrodes performance when used in a battery, ultracapacitor, pseudo-capacitor or fuel cell. These moieties may not necessarily be free-standing particles or solutes nor simply residing as loose particles in the pores of the electrodes. These moieties may furthermore be chemical functional groups that are chemically bound to the high purity carbonaceous structures of the electrode. In all such cases these moieties and compounds are removed from their bound chemical adhesion from the electrode pore walls by electrochemical breakdown from the disclosed treatment, into solution or suspension, then carried out of the electrode pores by the gaseous driven conveyance of the liquid solution as described herein. If such removed and disassociated moieties are charged ions or free radicals, they may be additionally driven into the solution electrolyte bath by electrochemical potential of the applied voltage.

Furthermore, such moieties have a voltage window of their own electrolysis below that of the more pure and structured carbonaceous scaffolding of the desirable electrode material, which in turn results in a cleansing effect of the electrodes' channels and pores. This electrochemical "scrubbing" of the electrodes' pore walls is a second level of activation of the electrodes effectuated by the disclosed invention.

This cleansing and expulsion of contaminants is evidenced by the severe darkening coloration of the aqueous electrolyte solution bath after multiple electrolytic cyclical alternating DC voltage potential cycles. Typical coloration of the electrolyte bath solution is that of an oxidized organic substance of brown color. Some coloration of the electrolyte bath is observable in the first cycle of electric potential application.

The cleansing of the internal pores and channels further increases the active and usable total surface area of the carbon electrodes thereby greatly increasing the electrical and chemical absorbency of the electrode material end product.

An example of the improvement in performance of the same electrode material prior to electrolysis treatment and after the disclosed electrolysis treatment is 3 to 4-fold, and as much as 20-fold in some cases when tested in an ultracapacitor application. This results in an increase from nominal 10 to 40 Farads per gram for the untreated electrodes to upwards of 150 to 300 Farads per gram for the same electrodes after electrolysis treatment by the disclosed method.

Additionally, the electrolytically and kinetically generated free-radicals in the pores and channels within the electrode also electrochemically react with certain less stable organic compounds within the electrodes at the carbon walls of the pores and channels and on the surfaces to then dissolve and remove undesirable organic compounds such as tars, oligomers, polysaccharides and simple sugars that can be formed when the electrode is made of biomass-sourced materials. Such reaction by-products are likewise expelled out from the pores and into the surrounding aqueous solution, further coloring the aqueous electrolyte bath solution with brown organic solute and suspensions.

Growth of Carbon-Based Nanostructures (Graphene, Several-Layer Graphene, Graphitic Platelets, and the Like)

The growth of carbon-based nanostructures is caused by the "release" of some carbon-containing oxidized and electrolyzed molecules or particles into the electrolyte bath solution by the electrolysis "off-gassing" of the disassociated water molecules in the bath solution and the "plating growth" of new carbon structures on the cathode and anode electrodes. The source of the carbon compounds for this carbonaceous plating and growth effect are from these carbonic compounds being transported back into the electrode pores and channels by the surrounding aqueous solution containing these carbonaceous organic moieties and by their ionic charge in the voltage potential that exists between the oppositely polarized electrodes.

Additionally, some carbonaceous chemical species transport no further than locally at the carbonaceous walls of the electrode pores and react with insipient electrolyte within the pores and reduce and plate-out or crystallize directly back onto the pore walls to form advantageous structures such as graphene and graphitic dendrites, thereby increasing surface area, conductivity and significantly increasing electric storage capability of the electrodes when treated by the disclosed method. These other side-reactions of the organic compounds in the carbonaceous electrode that react with the free-radicals generated in the electrochemistry of the system further supply carbon species that are then reduced back onto the inner wall surfaces of the electrode pores and channels, forming graphene-like structures and dendrites to greatly increase surface area and conductivity of the electrochemically activated final electrode item.

Under controlled conditions of electrolysis activation, it was noted that growth of "new" carbonaceous structure was observed using a scanning electron microscopy (SEM). This plating of new carbon material resulted from the mobility/migration of the loose carbon-based particles as well as disassociated carbonic free radicals being reduced onto active carbonaceous sites of the electrode's pores, inner walls and surfaces.

Plating/Growth of Other Materials, Such as Metals, Via the Use of a Counter-Electrode, or Metallic-Containing Salts, Introduced into the Aqueous Solution During Electrolysis can be Performed.

Such inclusions of metallic compounds and structures may require adjustment in the power supply DC voltage to account for the required galvanic potential and half-cell potential of the metal and a second potential voltage control of the counter-electrode itself, to properly control the contribution of this counter-electrode in the process of plating and forming of advantageous structures within the pores and surfaces of the treated electrodes according to the disclosed invention.

It is noted herein that a non-carbonaceous (metallic) counter electrode can be sacrificially used to electroplate the inner pores, channels and walls of the carbon electrode (i.e., transfer and deposit metallic atoms from one metallic counter-electrode to the target carbon electrode). The electric current and voltage different potential of the counter electrode drives charged atomic particles or ionic moieties from the surface of the counter electrode onto the surface of the target carbon electrode thereby growing a thin and localized plating of metallic moieties and structures on and within the pores of the carbon electrode. This may have an advantageous and phenomenal effect for the plated-carbon electrodes depending on the targeted application (e.g., electrochemistry, pseudo-capacitance, catalysis, etc.).

The disclosed method was used to plate iron, manganese and other metals onto the inner pore surfaces of the electrode. Results demonstrated improvements in electric storage performance of the electrodes. Other absorbency and desorbency effects of the electrode by this metallic deposition method, and other applications such as agriculture, chemical adsorption, catalysis, waste purification, waste absorbency, gas or liquid storage such as hydrogen, such as natural gas (methane), such as fuel, such as radioactive contaminants of mineral and petroleum recovery from geological fracturing (fracking) are further contemplated according to the present disclosure.

Use of Alternative Electrolyte Solutions Besides Alkaline KOH(aq), NaOH(aq), Etc.

Alkaline compound electrolytes (containing $OH^-$ ion species) in the bath solution serve to conduct electricity to facilitate the water electrolysis, but also play a role in the electrochemistry at the electrode surfaces to catalyze the disclosed effects to generate organic free radicals. The presence of other non-alkaline electrolyte ion species furthermore facilitates the reduction of these organic or metallic moieties to deposit and plate onto the pore and channel surfaces within the electrode, thereby greatly enhancing the properties and performance of these electrolysis treated electrodes for superior conductivity, and capacitive and pseudocapacitive performance.

Increased Capacitance of Treated Materials.

The treated electrodes (monolithic biochar wafers) generally increased in faradaic capacitance by 20% to 300%, and in some cases approximately 2,000%. Monolithic untreated biochar electrodes prior to being treated by the disclosed methods herein, and produced by the methods disclosed in the Favetta Patent Filings (incorporated by reference hereinabove) exhibit desirable electric capacitance such as 50 to 90 Farads/gram, such as 90 to 120 Farads/gram, such as 120 to 140 Farads/gram, and such as above 140 Farads/gram, depending on formulation and embodiments of the production processes utilized as further descried in the Favetta patent filings. These are very desirable results. After electrolysis treatment by the disclosed methods and systems herein, the same treated electrodes exhibit over 150 Farads/gram and up to 300 Farads/gram when used in an ultra-capacitor.

Description of Net-Shaped Wafer Process

Highly porous activated monolithic carbon electrodes with hierarchical pore structure were synthesized using the net-shaping process followed by high temperature charring with optional simultaneous chemical activation or optional post-charring chemical activation, as described in the Favetta Patent Filings (previously incorporated by reference).

Importance of Surface Area to Capacitance

The faradaic capacitance of the ultracapacitor is proportional to the surface area of the electrode and inversely proportional to the spacing between the electrodes; however, the relationship of capacitance and surface area is not necessarily purely linear. The disclosed process delivers an increase to the internal surface area of the electrode through multiple activation steps (such as high temperature chemical activation) and/or the disclosed electrolysis as described herein to optimize the surface area without compromising the structural integrity, mechanical stability, and underlying chemical properties of the carbonaceous biochar monolithic electrode wafer.

Exemplary Process Implementations

An exemplary disclosed electrochemical apparatus consists of a solvent bath of a conducting electrolyte such as 4 to 8 Molar potassium hydroxide (KOH), such as 1 to 3 Molar sulfuric acid ($H_2SO_4$), or such as a neutral salt such as 4 to 7 Molar potassium chloride (KCl). Additionally, the electrolyte in the bath can be a metal salt, such as iron nitrate ($Fe(NO_3)_3$) or such as iron hydroxide ($Fe(OH)_2$) or a manganese salt such as manganese chloride ($MnCl_2$), the species and concentrations of which depend on the particular metal desired to be plated onto and into the electrode and the total amount of such metal to be deposited on and within the electrode for increased properties, such as increased capacitance due to the iron or manganese based pseudo-capacitance.

The monolithic electrodes made of biochar, to be activated via this disclosed method can optionally be pre-treated to remove air/gas from the pores and pre-soak in this electrolyte with the aid of ultrasonication, or applied vacuum and subsequent re-pressurization while submerged in the electrolyte solution, in order to remove incipient gas from the pores and fully wet as much of the interior pore structure as possible. Note, however, this pre-soaking/impregnation is not required, but expedites the overall process by pre-wetting the internal pores of the electrode rather than waiting for the diffusion of the electrolyte into the pores to occur while the voltage potential is applied, which has been observed to take up to several minutes at the beginning of the first electrolysis cycle of applied voltage potential.

Additionally, the counter electrode described in the sections above can be made of a sacrificial metal which will then be plated onto and into the biochar electrode pores and surfaces during the electrolytic treatment as disclosed herein. The electrodes to be activated are then placed in the electrolyte solution bath as close as possible to each other without touching each other.

It is necessary that the oppositely polarized electrodes do not touch each other. This can be accomplished with the aid of an electrically insulating, porous separator to minimize this space between the electrodes and prevent electrode-to-electrode contact. Embodiments of such porous non-conducting separators can include a simple sponge or open-cell polymer foam rubber, porous plastic film, woven or non-woven cloth of polymer fiber, ceramic fiber, or silica-based fibers such as glass wool insulation and the like.

In exemplary embodiments of the disclosed invention, the distance between the electrodes was approximately 1 centimeter and these flat planar electrodes were maintained as parallel to each other as possible, to within about 10 to 15 degrees angle of the planes. The electrodes are held with conductive (preferably non-corroding) clamping device, such as alligator clips or any other simple clamping and fastening method or means, by a tab of electrically conductive material. All electrically conductive fastening and clamping parts other than the carbonaceous electrodes themselves are kept out of the conductive electrolyte solvent bath 40 avoid an electrical short circuit and to ensure electric current conduction only through the electrode material submerged in the bath and not via a short-circuit through the electrically conductive fasteners, clips, foils and metal holders into the electrically conductive electrolyte solvent bath. The electrically conductive fasteners, clips, foils and holders, such as alligator clips, such as spring clamps, such as weighted clamps, are then connected by wires to a direct current (DC) power supply. See 100 (FIG. 1A to FIG. 1D).

The DC power supply is then adjusted to a potential sufficient to activate the electrodes for the desired end result with a minimum of more than 1.7 Volts in order to hydrolyze (split) water. This voltage is also high enough to generate gaseous bubbles of hydrogen ($H_2$) and oxygen ($O_2$) on all surfaces of the monolithic wafer carbonaceous electrode including gas generation internal to the monolithic electrode body, in channels and pores. As these gas bubbles escape, they purge and transport out loose carbon, contaminants and ash particulates that were clogging the pores and channels of the electrode. Additionally, some micro and nano-structures of carbon that had been formed in the biochar electrode are further activated within the electrodes. Due to electrochemistry effects, some of the carbonaceous compounds that are loosened and transport into the liquid bath themselves additionally undergo electrochemical reactions with the biochar pore walls, and undergo chemical reduction into pure or near-pure carbon, thereby growing as platelets of ordered carbon structures, such as graphene, such as graphitic structures. Higher voltage and currents produce more aggressive bubbling and increase the rate at which activation, purging and graphene and graphitic growth occurs.

It should be noted that since basically all materials have a breakdown voltage, the maximum applied voltage should remain below such potential level to avoid disintegration of the electrode or its binder material or self-binding materials.

Additionally, higher voltages may be necessary to electrolyze certain carbonic moieties of the biochar that were disassociated from the biochar electrode, into solution, and then reduced, deposited or plated back into the carbonaceous biochar electrodes from the electrolyte solution or from carbonic ions introduced as salts or organic liquids into the electrolyte bath. Additionally, higher voltages may be necessary to plate certain metals into the carbonaceous biochar electrodes from the metallic counter electrode or from metallic ions introduced as salts into the electrolyte baths. The higher voltages up to 5.5 V can be utilized for this metallic electrochemical method as needed depending on the overpotential necessary to overcome resistances in the wiring and within the electrode itself. This "suggested" 5.5 Volts of potential between the electrodes unfortunately is near the breakdown voltage of much of the carbon structures in typical biochar carbonaceous electrodes such as those formed from biomass, hence caution should be taken when optimizing deposition rates and activations rates versus the limits of the breakdown voltages of the electrode material itself.

Description of Superior Properties Gained from Activation of Two Monolithic Biochar Electrode Wafers The post-charring activated carbon electrodes provided by other upstream methods (as described in the Favetta Patent Filings; previously incorporated by reference) may exhibit hydrophobic behaviors upon initial contact with an aqueous electrolyte solution when applying the methods of the invention disclosed herein. This typically results from incomplete charring and activation in prior steps or prior applied activation methods (see Favetta Patent Filings) which then results in less creation of the heat-produced micro and nano pores within the electrode or can be cause by obstructed pores within the electrodes or on the surface of the electrodes, from the byproduct of charring that can cover the surface of the electrode and cover the walls of the inner pores and channels of the electrodes during charring (see Favetta, et. al. provisional Ser. No. 62/826,005). Such undesirable charring byproducts can include tars, oligomers, and sugars such as polysaccharides.

However, the electrolysis treatment disclosed herein allows for the aqueous electrolyte solution to percolate into the internal structure of the electrode to then be catalyzed, oxidized, and reacted, thereby expelling the produced gases outward and widening the pores and removing any charring byproduct coatings. It was evidenced that the post-electrolysis wafers were more hydrophilic than the pre-electrolysis electrode wafers. Additionally, the opening and widening of the pores allowed for faster and more accessibility of the electrolytes (less diffusion resistance) and demonstrated significant improvement in capacitance, pseudo-capacitance, battery charge and discharge rates, and overall energy density and power density improvements of these assembled devices, as well as fuel-cell electrode volumetric efficiency and space-velocity.

Although the present disclosure has been described with reference to exemplary embodiments and implementations thereof, the present disclosure is not limited by or to such exemplary embodiments/implementations. Rather, the systems/methods of the present disclosure are susceptible to modifications, variations and refinements that will be apparent to persons skilled in the art based on the disclosure provided herein, and the present disclosure encompasses such modifications, variations and refinements.

The invention claimed is:

1. A method comprising:
providing a net-shaped monolithic electrode wafer consisting of biochar, wherein the net-shaped monolithic electrode wafer includes wafer surfaces and pores, wherein the pores include pore surfaces, and wherein one or more organic moieties reside within the pores and at the pore surfaces;
connecting the net-shaped monolithic electrode wafer to a current conducting fastener;
providing a counter electrode;
submerging the net-shaped monolithic electrode wafer and the counter electrode in an aqueous salt bath;
applying a voltage between 1.65 volts and 5.5 volts across the current conducting fastener and the counter electrode so as to induce a direct current to the submerged net-shaped monolithic electrode wafer, wherein the polarity of the applied voltage is cycled for three or more cycles for at least two minutes per cycle, to carry out electrolysis so as to hydrolyze water molecules in the aqueous salt bath, thereby (i) generating hydrogen gas, (ii) generating hydrogen ions, (iii) generating oxygen gas, (iv) generating hydroxyl ions based on a reaction of hydroxyl ions generated by hydrolysis of the water molecules with salt in the aqueous salt bath, and (v) electrolyzing the one or more organic moieties within the pores and at the pore surfaces of the net-shaped monolithic electrode wafer;
whereby the electrolysis is carried out so as to remove the one or more organic moieties from the net-shaped monolithic electrode wafer at least in part based on bubbling of the hydrogen gas and the oxygen gas through the pores of the net-shaped monolithic electrode wafer, and
whereby carbon generated by electrolysis of the one or more organic moieties bonds to at least one of the net-shaped monolithic electrode wafer surfaces and the pore surfaces to define an additive carbonaceous structure thereon;
thereby electro-activating the net-shaped monolithic electrode wafer, increasing active and usable total surface area of the net-shaped monolithic electrode wafer and increasing electrical and chemical absorbency of the net-shaped monolithic electrode wafer.

2. The method according to claim 1, wherein the applied voltage potential is between 1.7 V and 5.5 V.

3. The method according to claim 1, wherein the electrolysis generates free radicals and gases on the pore surface and within the pores of the net-shaped monolithic electrode wafer.

4. The method according to claim 3, wherein the generated gases form gas bubbles.

5. The method according to claim 4, wherein the electrolysis generates the free radicals and gases from the water molecules in the aqueous salt bath and from the one or more organic moieties within the pores and at the pore surfaces of the net-shaped monolithic electrode wafer.

6. The method according to claim 5, wherein the one or more organic moieties are removed from the pores and the pore surfaces of the net-shaped monolithic electrode wafer and dissolve in the aqueous salt bath, and wherein the dissolved one or more organic moieties are subject to the electrolysis.

7. The method according to claim 4, wherein the gas bubbles expand within the pores and on the wafer surfaces of the net-shaped monolithic electrode wafer and escape from the net-shaped monolithic electrode wafer, thereby pushing out, conveying out and transporting out the one or more organic moieties existing on the wafer surfaces and in the pores of the net-shaped monolithic electrode wafer.

8. The method according to claim 7, wherein the pushing out, conveying out and transporting out of contaminants, particles and the one or more organic moieties opens the pores of the net-shaped monolithic electrode wafers, thereby causing additional electro-activation of the net-shaped monolithic electrode wafer.

9. The method according to claim 1, wherein the electrolysis is carried out so as to remove at least one of tars, oils, sugars, polysaccharides and other impurities from the net-shaped monolithic electrode wafer.

10. The method according to claim 1, further comprising providing a co-solvent, a co-solute electrolyte or a combination of a co-solvent and a co-solute electrolyte, wherein the co-solvent and the co-solute electrolyte are each selected from the group consisting of glycols, alcohols, aqueous potassium hydroxide, aqueous sulfuric acid, aqueous potassium chloride or combinations thereof.

11. The method according to claim 10, wherein the co-solvent, the co-solute electrolyte or the combination of the co-solvent and the co-solute electrolyte is carried out so as to promote at least one of (i) graphene growth, (ii) graphite growth, and (iii) deposition and plating on pore surfaces of the net-shaped monolithic electrode wafer and within pores of the net-shaped monolithic electrode wafer.

12. The method according to claim 1, wherein the electrolysis of the dissolved one or more organic moieties provides a carbon source for growth of graphene and graphitic structures on the wafer surfaces and within the pores of the net-shaped monolithic electrode wafer.

13. The method according to claim 1, further comprising providing a counter-electrode of carbonaceous or non-carbonaceous structure and wherein the counter-electrode contributes to growth and plating of graphene and graphitic structures onto the wafer surfaces and within the pores of the net-shaped monolithic electrode wafer in response to the electrolysis.

14. The method according to claim 1, further comprising providing a metallic counter-electrode, and wherein the metallic counter-electrode contributes to plating and growth of nanostructures on the wafer surfaces and within the pores of the net-shaped monolithic electrode wafers.

15. The method according to claim 1, wherein the applied voltage polarity is cycled for three to five cycles.

16. The method according to claim 1, wherein the electrolysis is carried out so as to yield a post-treatment monolithic biochar wafer that exhibits an increase in at least one of capacitance, pseudo-capacitance and energy storage ability relative to the monolithic electrode wafer prior to the electrolysis.

17. The method according to claim 16, further comprising rinsing and drying the post-treatment monolithic biochar wafer for use in an aqueous application.

18. The method according to claim 16, further comprising rinsing and drying the post-treatment monolithic biochar wafer for use in a non-aqueous application.

19. The method according to claim 18, wherein the non-aqueous application is as an ultra-capacitor using one or more organic solvents.

20. The method according to claim 19, wherein the one or more organic solvents are selected from propylene carbonate and acetonitrile.

21. The method according to claim 19, further comprising one or more dissolved salts in the one or more organic solvents.

22. The method according to claim 21, wherein the one or more dissolved salts are selected from tetra-fluoro-borates, hexa-fluouro-phosphates, ionic liquids, pyrrolidinium compounds, imidazolium compounds, BIS (triflouromethyl-sulfone) amides and a combination or moiety thereof.

23. The method according to claim 1, further comprising using the post-treatment monolithic biochar wafer in an ultra-capacitor, pseudo-capacitor, battery or fuel cell, or in an absorbent or desorbing application.

* * * * *